US011270477B2

(12) United States Patent
Nett et al.

(10) Patent No.: US 11,270,477 B2
(45) Date of Patent: Mar. 8, 2022

(54) SYSTEMS AND METHODS FOR TAILORED IMAGE TEXTURE IN ITERATIVE IMAGE RECONSTRUCTION

(71) Applicant: General Electric Company, Schenectady, NY (US)

(72) Inventors: Brian Edward Nett, Brookfield, WI (US); Jiahua Fan, New Berlin, WI (US); Amber Christine Silvaggio, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 16/177,179

(22) Filed: Oct. 31, 2018

(65) Prior Publication Data

US 2020/0134883 A1 Apr. 30, 2020

(51) Int. Cl.
  *G06T 11/00* (2006.01)
  *G06F 17/15* (2006.01)
  *G06T 15/04* (2011.01)

(52) U.S. Cl.
  CPC ............ *G06T 11/003* (2013.01); *G06F 17/15* (2013.01); *G06T 15/04* (2013.01); *G06T 2211/421* (2013.01)

(58) Field of Classification Search
  CPC . G06T 11/003; G06T 15/04; G06T 2211/421; G06F 17/15
  See application file for complete search history.

(56) References Cited

U.S. PATENT DOCUMENTS

| 4,982,339 A | 1/1991 | Insana et al. |
| 2004/0258194 A1* | 12/2004 | Chen ..................... G06T 11/006 378/4 |
| 2006/0164426 A1* | 7/2006 | Cook ..................... G06T 15/50 345/581 |
| 2016/0256123 A1* | 9/2016 | Lu ......................... A61B 6/4085 |
| 2017/0178365 A1* | 6/2017 | Raupach .................. G06T 7/11 |
| 2018/0139377 A1* | 5/2018 | Zhang .................. A61B 5/0077 |
| 2019/0216409 A1* | 7/2019 | Zhou ........................ G06T 7/11 |

OTHER PUBLICATIONS

Kijewski, M. et al., "The noise power spectrum of CT images," Physics in Medicine and Biology, vol. 32, No. 5, May 1987, 11 pages.

Siewerdsen, J. et al., "A framework for noise-power spectrum analysis of multidimensional images," Medical Physics, vol. 29, No. 11, Nov. 2002, 17 pages.

Cupp, S., "A Practical Application for Noise Power Spectrum Analysis," Master of Science in Biomedical Sciences Thesis, Drexel University, May 2008, 79 pages.

(Continued)

*Primary Examiner* — Joshua L Schwartz (57) ABSTRACT

Methods and systems are provided for reconstructing images with a tailored image texture. In one embodiment, a method comprises acquiring projection data, and reconstructing an image from the projection data with a desired image texture. In this way, iterative image reconstruction techniques may be used to substantially reduce image noise, thereby enabling a reduction in injected contrast and/or radiation dose, while preserving an image texture familiar from analytic image reconstruction techniques.

10 Claims, 5 Drawing Sheets

(56) References Cited

OTHER PUBLICATIONS

Baek, J. et al., "The noise power spectrum in CT with direct fan beam reconstruction," Medical Physics, vol. 37, No. 5, May 2010, 8 pages.

Mehta, D. et al., "Effect of iterative reconstruction techniques on image texture," European Society of Radiology Website, Available Online at https://posterng.netkey.at/esr/viewing/index.php?module=viewing_poster&task=&pi=106746&searchkey=e9b3f8a40d042dfa1061c283d44ff700, Available as Early as Jan. 2011, 7 pages.

Solomon, J. et al., "Quantitative comparison of noise texture across CT scanners from different manufacturers," Medical Physics, vol. 39, No. 10, Oct. 2012, Available Online Sep. 18, 2012, 8 pages.

Li, K. et al., "Statistical model based iterative reconstruction (MBIR) in clinical CT systems: Experimental assessment of noise performance," Medical Physics, vol. 41, No. 4, Apr. 2014, 15 pages.

Chen, B. et al., "Assessment of volumetric noise and resolution performance for linear and nonlinear CT reconstruction methods," Medical Physics, vol. 41, No. 7, Jul. 2014, Available Online Jun. 13, 2014, 12 pages.

Dolly, S. et al., "Practical considerations for noise power spectra estimation for clinical CT scanners," Journal of Applied Clinical Medical Physics, vol. 17, No. 3, May 8, 2016, 16 pages.

\* cited by examiner

SYSTEMS AND METHODS FOR TAILORED IMAGE TEXTURE IN ITERATIVE IMAGE RECONSTRUCTION

FIELD

Embodiments of the subject matter disclosed herein relate to non-invasive diagnostic imaging, and more particularly, to tailoring image texture in iterative image reconstruction.

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of x-rays through the target volume, to acquire image data and to construct tomographic images (e.g., three-dimensional representations of the interior of the human body or of other imaged structures).

BRIEF DESCRIPTION

In one embodiment, a method comprises acquiring projection data, and reconstructing an image from the projection data with a desired image texture. In this way, iterative image reconstruction techniques may be used to substantially reduce image noise, thereby enabling a reduction in injected contrast and/or radiation dose, while preserving an image texture familiar from analytic image reconstruction techniques.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of medical imaging systems. In particular, systems and methods are provided for the reconstruction of CT images with a tailored image texture. An example of a CT imaging system that may be used to acquire images processed in accordance with the present techniques is provided in FIGS. 1 and 2. Iterative image reconstruction techniques typically include an image regularization step which de-noises the image via a non-linear smoothing in the image and/or data domain. As a result, these iterative image reconstruction techniques offer significant reductions in image noise and the reduction of image noise enables users to reduce injected contrast dose and/or the radiation dose of the imaging procedure. However, in addition to reducing the image noise overall, iterative techniques also modify the texture in the images with respect to analytic image reconstruction techniques. As radiologists and other medical practitioners have been trained for decades to review images reconstructed with analytic techniques, iteratively-reconstructed diagnostic images may seem less familiar and potentially confusing for those reviewing the images. One approach to making iteratively-reconstructed images easier to review, such as the method depicted in FIG. 3, may include reconstructing an image with a desired image texture. As image texture generally corresponds to finer-grained image noise, image texture may be quantitatively characterized by higher spatial frequency components of noise power spectra. The noise power spectra depicted in FIG. 4, for example, illustrates how image noise is distributed as a function of spatial frequency for iteratively-reconstructed and analytically-reconstructed images, as well as blended combinations of iteratively-reconstructed and analytically-reconstructed images. One particular approach to reconstructing images with a tailored image texture, such as the method depicted in FIG. 5, includes blending an analytically-reconstructed image with an iteratively-reconstructed image in frequency space, such that the higher-frequency components of the analytically-reconstructed image which contribute to image texture may be combined with the lower-frequency components of the iteratively-reconstructed image which exhibit relatively less noise overall. Weighting functions and weighted masks, such as the functions and masks depicted in FIGS. 6 and 7, may be used to blend the images in frequency space. The techniques described herein effectively reproduce a desired image texture while also reducing the noise overall, as illustrated by the water phantom images depicted in FIG. 8.

Though a CT system is described by way of example, it should be understood that the present techniques may also be useful when applied to images acquired using other imaging modalities, such as tomosynthesis, MRI, C-arm angiography, and so forth. The present discussion of a CT imaging modality is provided merely as an example of one suitable imaging modality.

Figure 1:
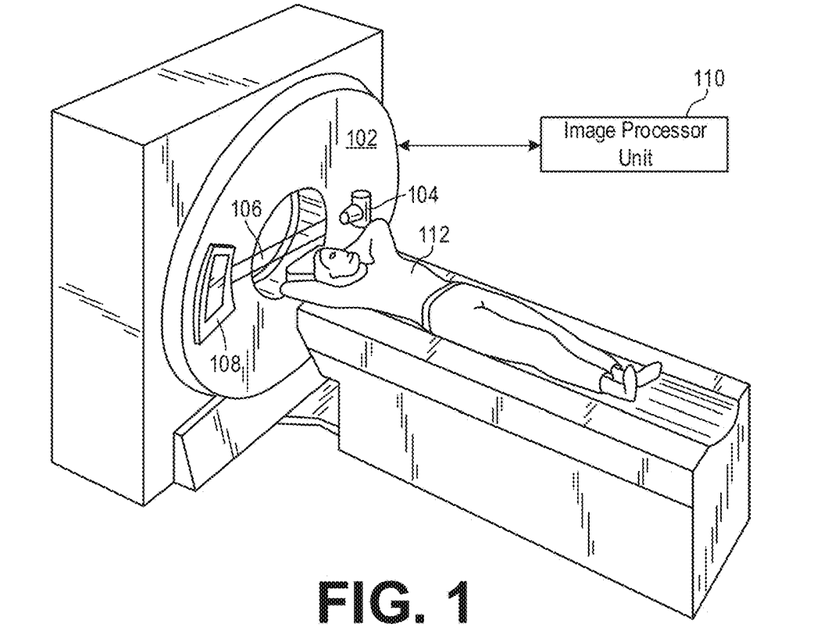
FIG. 1 shows a pictorial view of an imaging system according to an embodiment.

FIG. 1 illustrates an exemplary CT system 100 configured to allow fast and iterative image reconstruction. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray radiation source 104 configured to project a beam of x-ray radiation 106 for use in imaging the subject 112. Specifically, the x-ray radiation source 104 is configured to project the x-rays 106 towards a detector array 108 positioned on the opposite side of the gantry 102. Although FIG. 1 depicts only a single x-ray radiation source 104, in certain embodiments, multiple x-ray radiation sources and detectors may be employed to project a plurality of x-rays 106 for acquiring projection data corresponding to the patient at different energy levels. In some embodiments, the x-ray radiation source 104 may enable dual-energy gemstone spectral imaging (GSI) by rapid kVp switching. In some embodiments, the x-ray detector employed is a photon-counting detector which is capable of differentiating x-ray photons of different energies. In other embodiments, two sets of x-ray tube-detector are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered backprojection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some known CT imaging system configurations, a radiation source projects a cone-shaped beam which is collimated to lie within an X-Y-Z plane of a Cartesian coordinate system and generally referred to as an "imaging plane." The radiation beam passes through an object being imaged, such as the patient or subject 112. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detectors are acquired separately to produce a transmission profile.

In some CT systems, the radiation source and the detector array are rotated with a gantry within the imaging plane and around the object to be imaged such that an angle at which the radiation beam intersects the object constantly changes. A group of radiation attenuation measurements, i.e., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term view is not limited to the use as described above with respect to projection data from one gantry angle. The term "view" is used to mean one data acquisition whenever there are multiple data acquisitions from different angles, whether from a CT, PET, or SPECT acquisition, and/or any other modality including modalities yet to be developed as well as combinations thereof in fused embodiments.

The projection data is processed to reconstruct an image that corresponds to a two-dimensional slice taken through the object. One method for reconstructing an image from a set of projection data is referred to in the art as the filtered backprojection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate (or are configured to generate) at least one viewable image.

Figure 2:
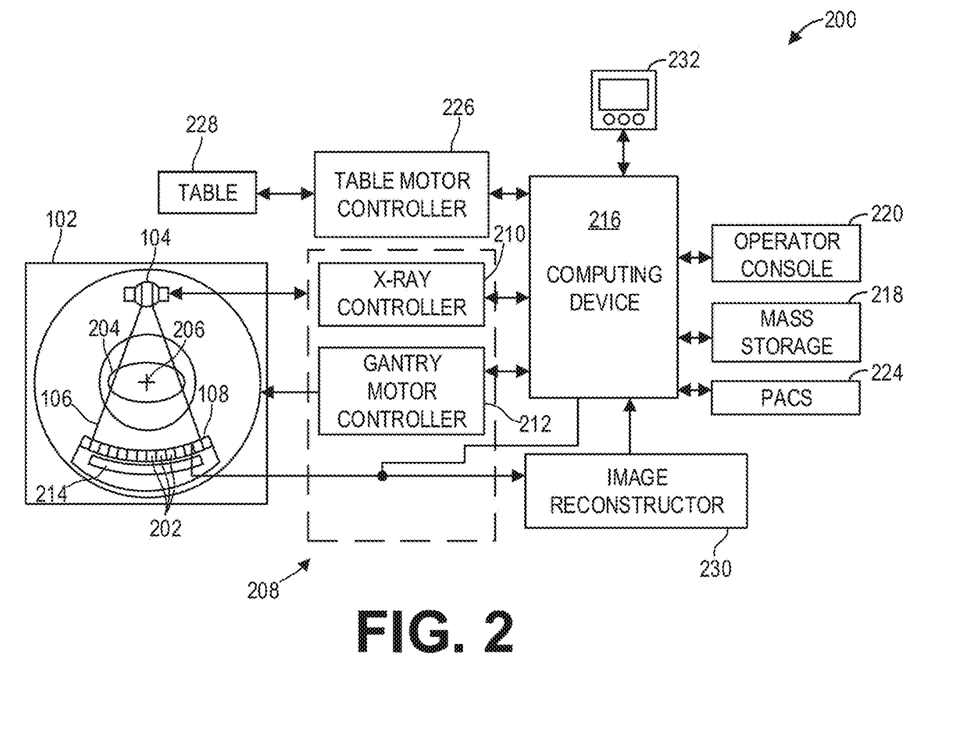
FIG. 2 shows a block schematic diagram of an exemplary imaging system according to an embodiment.

FIG. 2 illustrates an exemplary imaging system 200 similar to the CT system 100 of FIG. 1. In accordance with aspects of the present disclosure, the imaging system 200 is configured for iterative image reconstruction with tailored image noise texture. In one embodiment, the imaging system 200 includes the detector array 108 (see FIG. 1). The detector array 108 further includes a plurality of detector elements 202 that together sense the x-ray beams 106 (see FIG. 1) that pass through a subject 204 such as a patient to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In dual or multi-energy imaging, two or more sets of projection data are typically obtained for the imaged object at different tube kilovoltage (kVp) levels, which change the maximum and spectrum of energy of the incident photons comprising the emitted x-ray beams or, alternatively, at a single tube kilovoltage (kVp) level or spectrum with an energy resolving detector of the detector array 108.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of the two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray radiation source 104. In certain embodiments, the control mechanism 208 further includes an x-ray controller 210 configured to provide power and timing signals to the radiation source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The data sampled and digitized by the DAS 214 is transmitted to a computer or computing device 216. In one example, the computing device 216 stores the data in a storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates only one operator console 220, more than one operator console may be coupled to the imaging system 200, for example, for inputting or outputting system parameters, requesting examinations, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks.

In one embodiment, for example, the imaging system 200 either includes or is coupled to a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 228 which may comprise a motorized table. Particularly, the table motor controller 226 moves the table 228 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 transmits the reconstructed images to the computing device 216 for generating useful patient information for diagnosis and evaluation. In certain embodiments, the computing device 216 transmits the reconstructed images and/or the patient information to a display 232 communicatively coupled to the computing device 216 and/or the image reconstructor 230.

The various methods and processes described further herein may be stored as executable instructions in non-transitory memory on a computing device in imaging system 200. In one embodiment, image reconstructor 230 may include such executable instructions in non-transitory memory, and may apply the methods described herein to reconstruct an image from scanning data. In another embodiment, computing device 216 may include the instructions in non-transitory memory, and may apply the methods described herein, at least in part, to a reconstructed image after receiving the reconstructed image from image reconstructor 230. In yet another embodiment, the methods and processes described herein may be distributed across image reconstructor 230 and computing device 216.

In one embodiment, the display 232 allows the operator to evaluate the imaged anatomy. The display 232 may also allow the operator to select a volume of interest (VOI) and/or request patient information, for example, via a graphical user interface (GUI) for a subsequent scan or processing.

Figure 3:
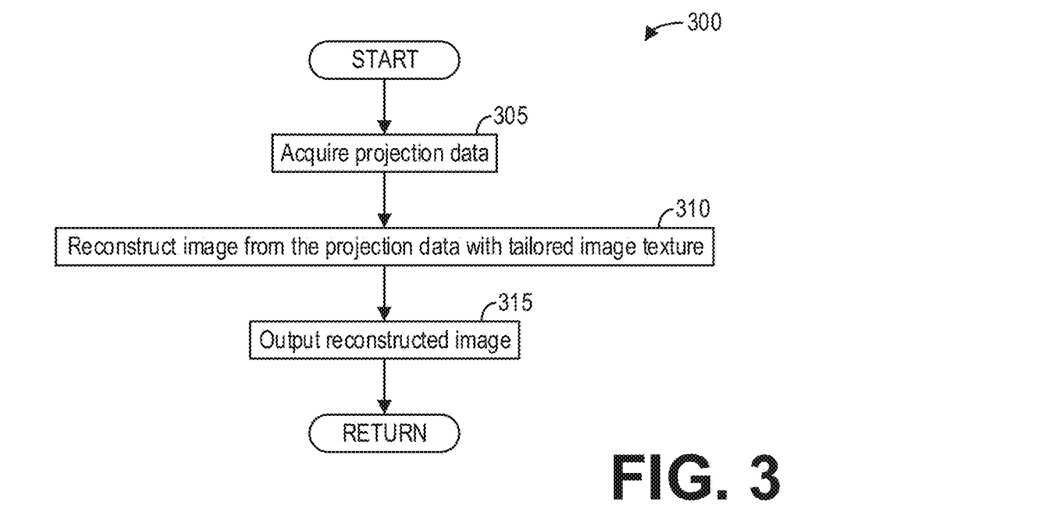
FIG. 3 shows a high-level flow chart illustrating an example method for reconstructing images with tailored noise texture according to an embodiment.

FIG. 3 shows a high-level flow chart illustrating an example method 300 for reconstructing images with tailored image texture according to an embodiment. Method 300 is described with regard to the systems and components of FIGS. 1 and 2, though it should be appreciated that the method 300 may be implemented with other systems and components without departing from the scope of the present disclosure. Method 300 may be implemented as executable instructions in non-transitory memory of one or more computing devices, such as the image reconstructor 230 and/or the computing device 216.

Method 300 begins at 305. At 305, method 300 acquires projection data. For example, acquiring projection data may comprise controlling one or more components of the CT imaging system to scan at least a portion of a subject according to a scan protocol, and receiving corresponding projection data as described hereinabove with regard to FIGS. 1 and 2.

Continuing at 310, method 300 reconstructs an image from the projection data with a tailored image texture. For example, image texture comprises an amount of fine-grained image noise distributed across the image. The image texture of the image may thus be tailored to a desired image texture by reconstructing the image from the projection data such that the image texture comprises the desired image texture. As discussed further herein with regard to FIG. 4, such fine-grained image noise which may be understood as image texture corresponds to noise of higher spatial frequencies, whereas noise of lower spatial frequencies corresponds to larger noise blobs or other image artifacts. Reconstructing the image such that the image texture comprises the desired image texture thus includes identifying the desired image texture, for example by specifying a desired amount and/or a distribution of image noise within a particular range of spatial frequencies, and controlling the reconstruction of the image such that the distribution of image noise within the particular range of spatial frequencies corresponds to the desired amount and/or distribution of image noise.

In one example, reconstructing an image from the projection data with a tailored image texture comprises reconstructing a first image from the projection data with an analytic image reconstruction algorithm, reconstructing a second image from the same projection data with an iterative image reconstruction algorithm, and performing a frequency-dependent blending of the first image and the second image to produce a third image that exhibits the reduced image noise of the second image and the image texture of the first image. An example method for frequency-dependent blending of analytic and iterative images to achieve tailored image texture is described further herein with regard to FIG. 5.

In another example, reconstructing an image from the projection data with a tailored image texture comprises reconstructing a first image from the projection data with an analytic image reconstruction algorithm, reconstructing a second image from the projection data with an iterative image reconstruction algorithm, and blending the first image with the second image via image-based convolutions to produce a third image that exhibits the reduced image noise of the second image and the image texture of the first image.

In yet another example, reconstructing an image from the projection data with a tailored image texture comprises reconstructing an image from the projection data with an iterative image reconstruction algorithm, wherein the image texture is enforced during at least a subset of the iterations of the iterative image reconstruction algorithm. For example, the image texture may be enforced during each iteration, or at least two or more iterations of the iterative image reconstruction. The image texture may be enforced during the iterations by applying a weighting that enforces a desired image texture behavior on the image. This process can be done during each iteration of an iterative procedure or only every Nth iteration, where N may be configured.

In another example, reconstructing an image from the projection data with a tailored image texture comprises reconstructing an image from the projection data with an analytic image reconstruction algorithm such as FBP, and inputting the image into a deep learning algorithm which outputs a de-noised image with the desired image texture. For example, the deep learning algorithm may be explicitly trained with de-noised images with a desired noise power spectrum, such that the frequency distribution of noise of an image output by the deep learning algorithm resembles the desired noise power spectrum, with an emphasis on higher-frequency components of the noise power spectrum that correspond to image texture.

At 315, method 300 outputs the reconstructed image. For example, method 300 may output the reconstructed image to a display device such as the display 232. The reconstructed image as displayed exhibits the image texture of an FBP image with less noise than an FBP image. Additionally, the reconstructed image may be output to mass storage 218 and/or PACS 224 for subsequent retrieval or display at a remote location. Method 300 then ends.

Figure 4:
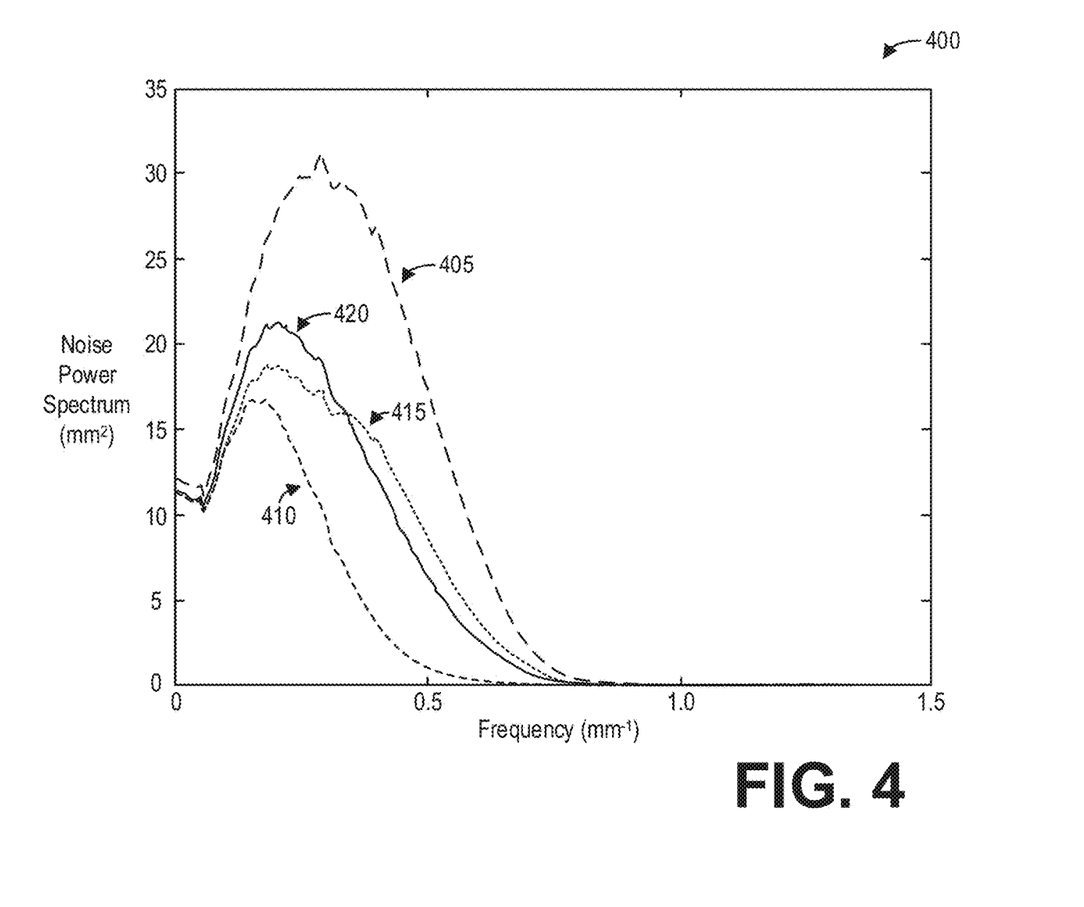
FIG. 4 shows a graph illustrating example noise power spectra for reconstructed images according to an embodiment.

FIG. 4 shows a graph 400 illustrating example noise power spectra for various reconstructed images according to an embodiment. In particular, the graph 400 depicts the noise power spectrum 405 for an image reconstructed from a set of projection data with filtered back projection, also referred to herein simply as an FBP image, as well as the noise power spectrum 410 for an image reconstructed from the same set of projection data with an iterative reconstruction algorithm, also referred to herein simply as an iterative image. The iterative reconstruction algorithm enables a substantial noise reduction in comparison to the filtered back projection technique, as depicted by the noise power spectra 405 and 410.

As discussed hereinabove, radiologists or other healthcare providers may be accustomed to reviewing images reconstructed according to the filtered back projection approach, and so an iterative image with substantially reduced noise may seem unnatural or unfamiliar. One approach to resolving this unfamiliarity includes linearly blending an iterative image with an FBP image to provide a more familiar noise level in the resulting blended image. As an illustrative example, graph 400 depicts the noise power spectrum 420 for an image comprising a linear image-space blend of an iterative image and an FBP image. The linear image-space blend comprises a 50% blend in image space, such that the image comprises 50% of the iterative image and 50% of the FBP image.

However, the linear image-space blending approach is limited in that a linear image-space blending generates an image wherein higher spatial frequencies of the noise are heavily suppressed, as depicted by the noise power spectrum 420. Lower spatial frequencies of the noise generally correspond to larger noise artifacts, whereas higher spatial frequencies of the noise correspond to fine-grained noise, which may be understood or interpreted by a reviewer as image texture. Thus, a linear image-space blending of an FBP image and an iterative image may simply increase the overall noise level relative to the iterative image while suppressing the familiar image texture of the FBP image.

As described further herein, a frequency-based blending of an iterative image with an FBP image may be tailored such that frequency components of the FBP image corresponding to image texture are more heavily weighted in comparison to the iterative image. As an illustrative example, graph 400 depicts the noise power spectrum 415 for an image generated from a tailored blend of an FBP image and an iterative image wherein higher frequency components of the FBP image are weighted heavier than the corresponding components of the iterative image, while the lower frequency components of the iterative image are weighted heavier than the corresponding components of the FBP image. As a result, the tailored image exhibits a lower overall noise with respect to both the FBP image and the linear image-space blended image while preserving the image texture of the FBP image. In this way, the resulting noise-tailored image leverages the substantially reduced noise levels of the iterative image while providing the familiar image texture of the FBP image.

Figure 5:
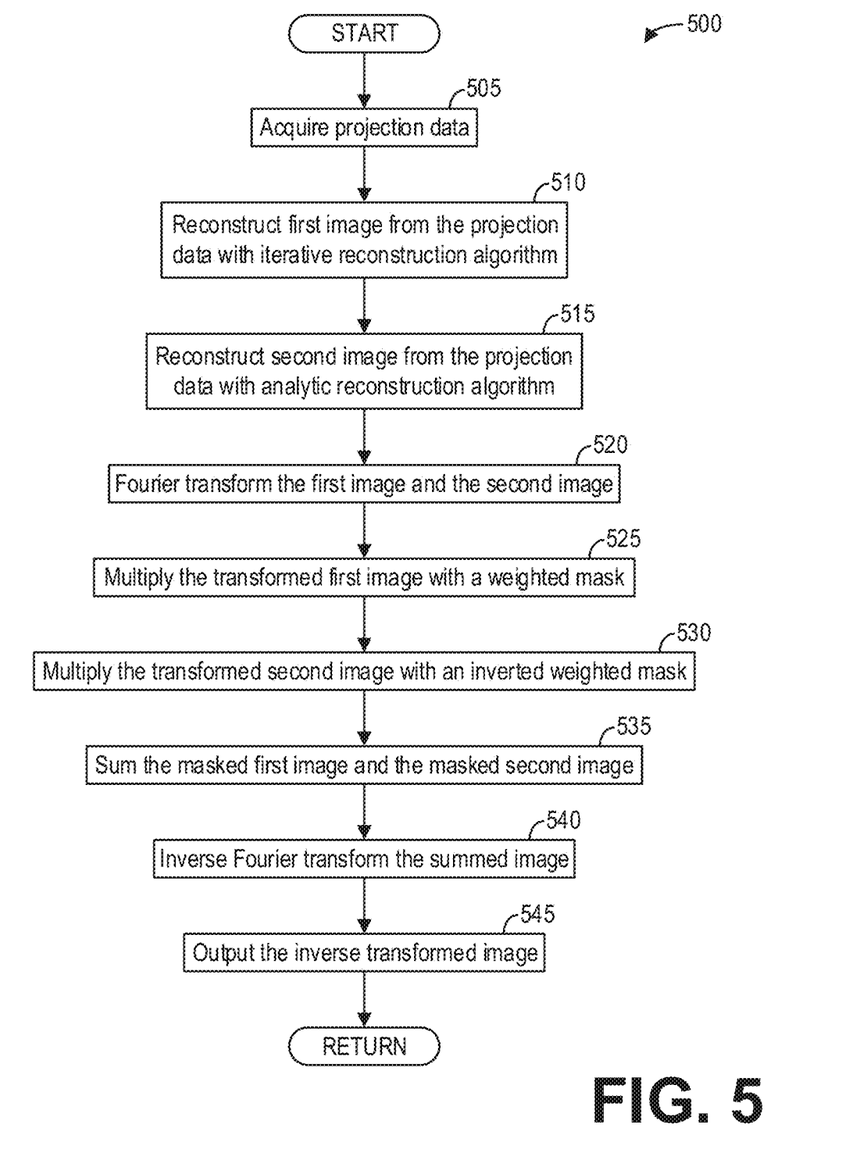
FIG. 5 shows a high-level flow chart illustrating an example method for frequency-based blending of reconstructed images to achieve a desired image texture according to an embodiment.

FIG. 5 shows a high-level flow chart illustrating an example method 500 for frequency-based blending of reconstructed images to achieve a desired image texture according to an embodiment. In particular, method 500 relates to selectively blending images reconstructed using analytic and iterative reconstruction techniques to achieve a tailored image texture. Method 500 is described with regard to the systems and components of FIGS. 1 and 2, though it should be appreciated that the method 500 may be implemented with other systems and components without departing from the scope of the present disclosure. Method 500 may be stored as executable instructions, for example, in the non-transitory memory of the image reconstructor 230 and/or the computing device 216.

Method 500 begins at 505. At 505, method 500 acquires projection data. Method 500 acquires projection data, for example, by controlling an x-ray source 104 according to a scan protocol to scan at least a portion of a subject 204, as described hereinabove with regard to FIGS. 1 and 2, and acquiring projection data via the plurality of detector elements 202. Alternatively, method 500 may retrieve projection data previously acquired and stored in non-transitory memory, such as mass storage 218, or from PACS 224.

After acquiring the projection data, method 500 continues to 510. At 510, method 500 reconstructs a first image from the projection data with an iterative reconstruction algorithm. For example, method 500 may reconstruct the first image from the projection data using an iterative reconstruction technique such as ASIR, CG, MLEM, MBIR, or another iterative reconstruction technique suitable for CT imaging.

Further, at 515, method 500 reconstructs a second image from the projection data with an analytic reconstruction algorithm. For example, method 500 may use the FBP technique to reconstruct the second image from the projection data. Although FIG. 5 depicts the iterative reconstruction occurring prior to the analytic reconstruction, it should be appreciated that the analytic reconstruction may be performed prior to or concurrent with the iterative reconstruction. Furthermore, in some examples, method 500 may use a separate filter kernel for each reconstruction kernel according to the effect of the iterative reconstruction on the noise power spectrum.

After reconstructing the first image and the second image, method 500 continues to 520. At 520, method 500 transforms the first image and the second image into frequency space by applying a Fourier transform to the first image and the second image. In this way, the images are prepared for frequency-dependent blending.

At 525, method 500 multiplies the transformed first image with a weighted mask to produce a masked first image, while at 530, method 500 multiplies the transformed second image with an inverted weighted mask to produce a masked second image. The weighted mask is configured such that frequency components of the first image associated with image texture are down-weighted when the second image is multiplied by the weighted mask. The inverted weighted mask comprises the inverse or the complement of the weighted mask, such that frequency components of the second image associated with image texture are up-weighted when the second image is multiplied by the inverted weighted mask. After multiplying the transformed images by the masks, method 500 continues to 535. At 535, method 500 sums the masked first image and the masked second image to produce a blended image.

Figure 6:
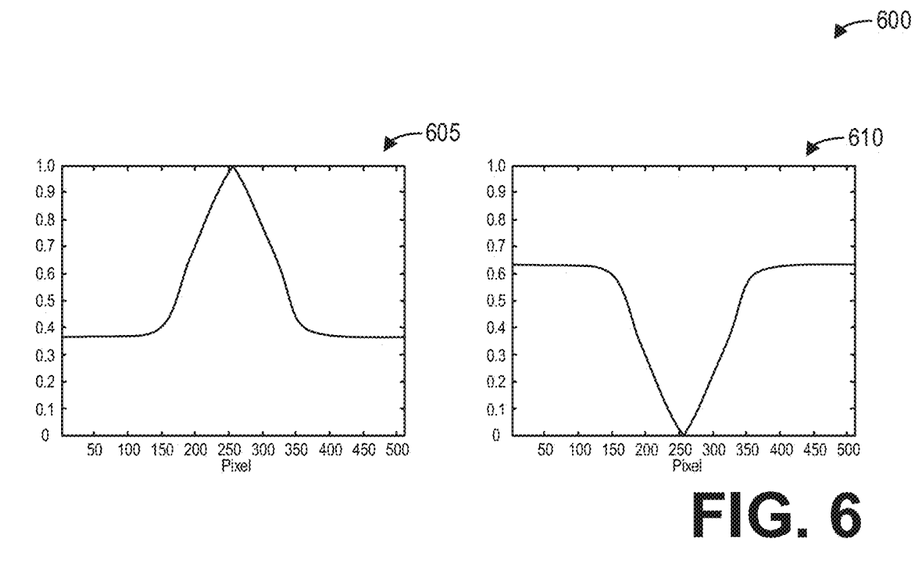
FIG. 6 shows example weighting functions for frequency-based blending of reconstructed images to achieve a desired image texture according to an embodiment.
Figure 7:
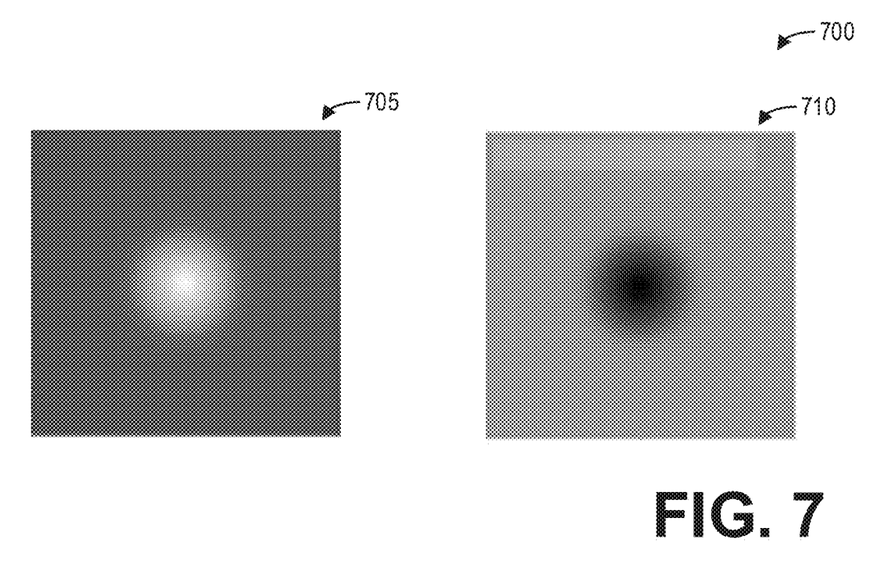
FIG. 7 shows example weighted masks corresponding to the weighting functions of FIG. 6 for frequency-based blending of reconstructed images according to an embodiment.

As an illustrative example, FIG. 6 shows a set of example weighting functions 600 and FIG. 7 shows a corresponding set of weighted masks 700 according to an embodiment. In particular, the weighting functions 600 include a first weighting function 605 and a second weighting function 610 that is the inverse of the first weighting function 605. The weighting functions 600 depict relative weights as a function of pixel in frequency space. The spatial frequencies begin at zero in the center of the image (i.e., at the $250^{th}$ pixel for an image 500 pixels wide) and increase towards the edges (e.g., towards the 0th pixel and the $500^{th}$ pixel). Thus, as depicted, the first weighting function 605 strongly weights the lower spatial frequencies relative to the higher spatial frequencies, whereas the second weighting function 610 weights the higher spatial frequencies substantially higher than the lower spatial frequencies.

By weighting the first image according to the first weighting function 605, the lower spatial frequencies of the first image are substantially preserved while the higher spatial frequencies are relatively down-weighted. Meanwhile, by weighting the second image according to the second weighting function 610, the lower spatial frequencies of the second image are substantially down-weighted, and in particular the lowest spatial frequencies are altogether eliminated from the second image, while the higher spatial frequencies are relatively preserved.

To weight the images according to the weighting functions 605 and 610, weighted masks such as the weighted masks 700 may be generated from the weighting functions 600. The weighted mask 705 corresponds to the first weighting function 605 while the inverted weighted mask 710 corresponds to the second weighting function 610. Multiplying the first and second images in frequency space by the weighted masks 705 and 710, respectively, thus applies the weightings of the weighting functions 600 to the images. Summing the images together, as performed at 535, thus produces an image in frequency space that comprises a weighted combination of the first image and the second image according to the weighting functions 600.

The weighting functions may be calculated a priori using noise measurements from a homogenous phantom, or other data wherein the noise power spectrum may be estimated.

Various objectives may be used in order derive the ideal behavior of the noise power spectrum including tuning the weighting function based on clinical feedback, and preserving the shape of the noise power spectrum from the filtered backprojection (FBP) image.

In some examples, the fraction of each image's content contribution at each frequency is obtained via deep learning wherein a neural network is trained using data of the desired noise power spectrum characteristics such that the desired noise power spectrum is achieved. That is, weighting functions such as the weighting functions 600 may be calculated via a neural network. Further, in some examples, the neural network or a separate deep learning algorithm may be used to identify the optimal texture in the images for a given clinical task.

In some examples, the image texture may be controlled by the user. For example, a user may input, via a user interface or operator console such as operator console 220, an indication of a desired image texture along with a command to reconstruct an image from projection data. The indication of the desired image texture may comprise a level to which the image texture corresponds to image texture typical to FBP images, for example, and in turn the weighting functions or weighted masks may be selected or generated according to the indicated level. That is, the blending level (e.g., the relative contribution of the FBP image to the final image) may be selected by the user.

Referring again to FIG. 5, method 500 continues to 540 after summing the masked images. At 540, method 500 applies an inverse Fourier transform to the summed image to transform the summed or blended image into image space. At 545, method 545 outputs the inverse transformed image which comprises a weighted combination of the first image and the second image. Method 500 then returns.

Figure 8:
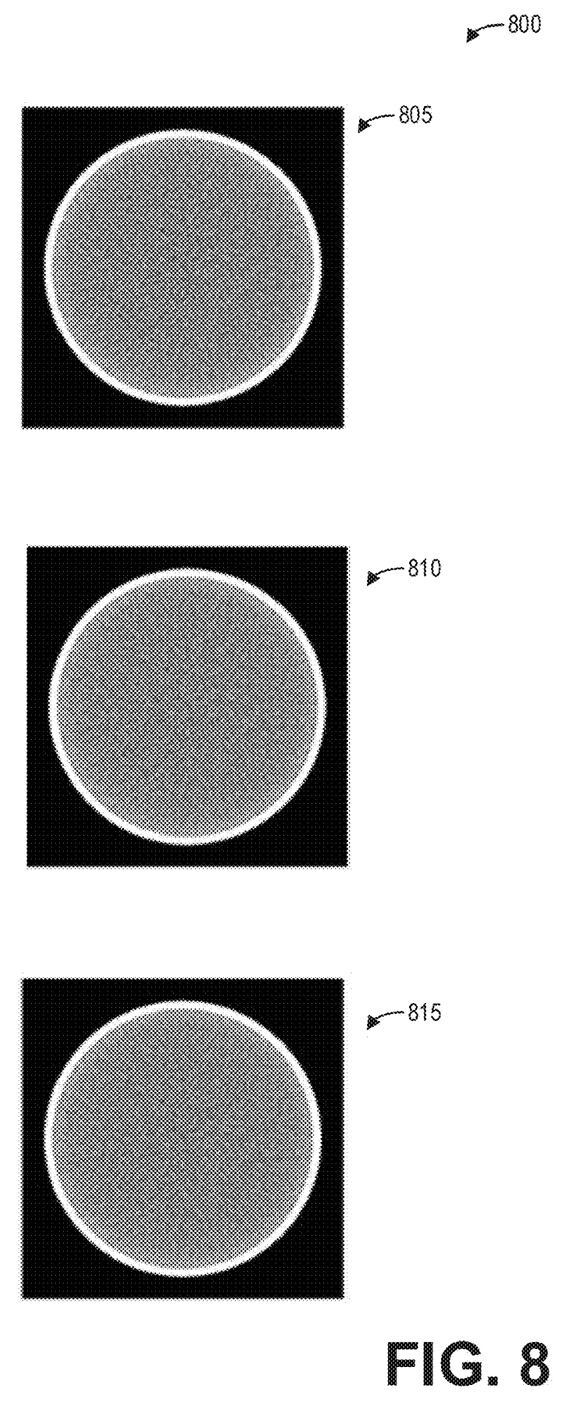
FIG. 8 shows a set of water phantom images reconstructed with different image reconstruction techniques.

As an illustrative example, FIG. 8 shows a set of water phantom images 800 reconstructed with different image reconstruction techniques. The first image 805 of a water phantom is reconstructed from projection data with filtered back projection, the second image 810 of the water phantom is reconstructed from a linear image-based blend of an FBP image and an iterative image (with a matching noise variance to a 50% scalar linear blend) reconstructed from the projection data, and the third image 815 is reconstructed from a frequency-based blend of the FBP image and the iterative image. The noise power spectra depicted in FIG. 4 and described hereinabove are measured from the water phantom images 800.

As depicted, the second image 810 exhibits less noise overall than the first image 805 but with a different type of image texture. The third image 815 generated according to the method of FIG. 5 similarly exhibits less noise overall than the first image 805 but with a similar image texture.

A technical effect of the disclosure is the reconstruction of diagnostic images with a tailored image texture. Another technical effect of the disclosure is the display of a reconstructed image with reduced noise and a desired image texture. Yet another technical effect of the disclosure is the control of x-ray source(s) and detector(s) and the reconstruction of a noise-reduced image with a desired image texture from projection data acquired during said control of the x-ray source(s) and detector(s).

In one embodiment, a method comprises acquiring projection data, and reconstructing, from the projection data, an image with a desired image texture.

In a first example of the method, the method further comprises reconstructing a first image from the projection data with a first image reconstruction algorithm, reconstructing a second image from the projection data with a second image reconstruction algorithm, and blending the first image and the second image to generate the image with the desired image texture. The first image and the second image may be blended to generate the image with the desired image texture. In a second example of the method optionally including the first example, the method further comprises transforming the first image and the second image into frequency space, wherein blending the first image and the second image comprises generating a weighted summation of the first image and the second image in frequency space. In a third example of the method optionally including one or more of the first and second examples, the method further comprises multiplying a frequency representation of the first image with a weighted mask to generate a masked first image and multiplying a frequency representation of the second image with an inverted weighted mask to generate a masked second image, wherein generating a weighted summation of the first image and the second image in frequency space comprises summing the masked first image and the masked second image in frequency space. In a fourth example of the method optionally including one or more of the first through third examples, the method further comprises calculating the weighted mask from a noise power spectrum, wherein the inverted weighted mask comprises an inversion of the weighted mask. The weighted mask may be calculated from the noise power spectrum of the first image, for example, or may be measured from the noise power spectrum of a phantom image or another image with desirable image texture properties prior to the acquisition. In a fifth example of the method optionally including one or more of the first through fourth examples, calculating the weighted mask from the noise power spectrum of the first image comprises determining, with a trained neural network, a contribution of the first image at each spatial frequency to the image. In a sixth example of the method optionally including one or more of the first through fifth examples, blending the first image and the second image to generate the image with the desired image texture comprises applying convolutions to the first image and the second image, and summing the images in image space. In a seventh example of the method optionally including one or more of the first through sixth examples, the method further comprises calculating the convolutions from a noise power spectrum of the first image. In an eighth example of the method optionally including one or more of the first through seventh examples, the first image reconstruction algorithm comprises an iterative image reconstruction algorithm and wherein the second image reconstruction algorithm comprises filtered back projection (FBP). In a ninth example of the method optionally including one or more of the first through eighth examples, the method further comprises reconstructing, from the projection data with FBP, an FBP image, and inputting the FBP image into a trained neural network to generate the image with the desired image texture. In a tenth example of the method optionally including one or more of the first through ninth examples, reconstructing the image with the desired image texture comprises reconstructing, from the projection data with an iterative image reconstruction algorithm, the image, wherein the desired image texture is enforced during at least a subset of iterations during reconstruction. In an eleventh example of the method optionally including one or more of the first through tenth examples, the method further comprises receiving, from a user via a user interface, an indication of the desired image texture. In such examples, the desired image texture comprises a desired distribution of image noise.

In another embodiment, a method comprises acquiring projection data of a subject, iteratively reconstructing a first image from the projection data, analytically reconstructing a second image from the projection data, and generating an image with a desired image texture from the first image and the second image.

In a first example of the method, the method further comprises transforming the first image and the second image into frequency space, multiplying the transformed first image with a first mask, multiplying the transformed second image with a second mask, summing the masked first image and the masked second image to generate a blended image, and transforming the blended image into image space to generate the image with the desired image texture, wherein the desired image texture comprises higher-frequency components of the second image. In a second example of the method optionally including the first example, the first mask reduces higher-frequency components of the first image relative to lower-frequency components of the first image, and wherein the second mask comprises an inversion of the first mask.

In yet another embodiment, a system comprises an x-ray source that emits a beam of x-rays toward an object to be imaged, a detector that receives the x-rays attenuated by the object, a data acquisition system (DAS) operably connected to the detector, and a computing device operably connected to the DAS and configured with executable instructions in non-transitory memory that when executed cause the computing device to: acquire, via the DAS, projection data of the object, and reconstruct, from the projection data, an image with a desired image texture.

In a first example of the system, the computing device is further configured with executable instructions that when executed cause the computing device to reconstruct a first image from the projection data with a first image reconstruction algorithm, reconstruct a second image from the projection data with a second image reconstruction algorithm, and blend the first image and the second image to generate the image with the desired image texture. In a second example of the system optionally including the first example, the computing device is further configured with executable instructions that when executed cause the computing device to multiply the first image by a first mask in frequency space to generate a first masked image, and multiply the second image by a second mask in frequency space to generate a second masked image, wherein blending the first image and the second image comprises summing the first masked image and the second masked image in frequency space to generate a blended image, and transforming the blended image into image space to generate the image with the desired image texture. In a third example of the system optionally including one or more of the first and second examples, the first image reconstruction algorithm comprises an iterative image reconstruction algorithm, the second image reconstruction algorithm comprises filtered back projection, the first mask weights lower-frequency components substantially higher relative to higher-frequency components, and the second mask comprises an inversion of the first mask such that the blended image substantially comprises lower-frequency components of the first image and higher-frequency components of the second image, wherein the higher-frequency components of the second image provide the desired image texture. In a fourth example of the system optionally including one or more of the first through third examples, the system further comprises an operator console communicatively coupled to the computing device, wherein the computing device is further configured with executable instructions that when executed cause the computing device to receive, from an operator via the operator console, an indication of the desired image texture.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. Although the examples provided herein are related to medical application, the scope of the present disclosure covers non-destructive testing in industrial, biomedical, and other fields. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
acquiring projection data;
reconstructing a first image from the projection data with a first image reconstruction method;
reconstructing a second image from the projection data with a second image reconstruction method;
blending the first image and the second image to generate a blended image with a desired image texture;
wherein the blended image includes an image texture of the first image and an image noise of the second image; and
wherein blending the first image and the second image to generate the image with the desired image texture comprises applying convolutions to the first image and the second image, and summing the images in image space; and
wherein the convolutions are calculated from a noise power spectrum of the first image.

2. The method of claim 1, further comprising transforming the first image and the second image into frequency space, wherein blending the first image and the second image comprises summing a weighted combination of the first image and the second image in frequency space.

3. The method of claim 2, further comprising multiplying a frequency representation of the first image with a weighted mask to generate a masked first image and multiplying a frequency representation of the second image with an inverted weighted mask to generate a masked second image, wherein summing a weighted combination of the first image and the second image in frequency space comprises summing the masked first image and the masked second image in frequency space.

4. The method of claim 3, further comprising calculating the weighted mask from a noise power spectrum, wherein the inverted weighted mask comprises an inversion of the weighted mask.

5. The method of claim 4, wherein calculating the weighted mask from the noise power spectrum comprises determining, with a trained neural network, a contribution of the first image at each spatial frequency to the image.

6. The method of claim 1, wherein the first image reconstruction method comprises an iterative reconstruction method and wherein the second image reconstruction method comprises a filtered back projection (FBP) method.

7. The method of claim 1, further comprising reconstructing, from the projection data with a filtered back projection (FBP) method, an FBP image, and inputting the FBP image into a trained neural network to generate the first image with a desired image texture.

8. The method of claim 1, wherein the projection data is acquired by a computed tomography (CT) imaging system.

9. The method of claim 1, wherein the first reconstruction method is an non-iterative reconstruction method and the second reconstruction method is an iterative reconstruction method.

10. The method of claim 7, wherein the image texture is reinforced during a subset of iterations of the iterative reconstruction method.

* * * * *